United States Patent [19]

Skerlos

[11] 3,760,094

[45] Sept. 18, 1973

[54] AUTOMATIC FINE TUNING WITH PHASE-LOCKED LOOP AND SYNCHRONOUS DETECTION

[75] Inventor: Peter C. Skerlos, Arlington Heights, Ill.

[73] Assignee: Zenith Radio Corporation, Chicago, Ill.

[22] Filed: Feb. 18, 1971

[21] Appl. No.: 116,319

[52] U.S. Cl. ..................... 178/5.4 SD, 178/DIG. 12

[51] Int. Cl. .......................... H04n 9/50, H04n 5/58

[58] Field of Search .................... 178/5.4 R, 5.4 SD, 178/DIG. 12; 329/50, 168, 178; 325/329, 330, 331, 346, 418, 419, 420, 421, 422, 423, 487, 327, 416, 417, 430; 330/30 D; 307/232

[56] References Cited

UNITED STATES PATENTS

| | | | |
|---|---|---|---|
| 2,999,154 | 9/1961 | Krause | 325/329 |
| 2,976,409 | 3/1961 | Loughlin | 329/50 |
| 2,956,112 | 11/1960 | O'Toole | 178/5.4 R |
| 2,829,247 | 4/1958 | Thomas, Jr. | 178/DIG. 12 |
| 2,266,517 | 12/1941 | Rust et al. | 325/423 |
| 3,064,143 | 11/1962 | Sanderson | 307/237 |
| 3,550,040 | 12/1970 | Sinusas | 330/30 D |
| 3,569,853 | 3/1971 | Woleisza | 307/232 |
| 2,837,646 | 6/1958 | Campbell | 329/50 |
| 2,750,440 | 6/1956 | Sziklai | 178/5.4 SD |

FOREIGN PATENTS OR APPLICATIONS

| | | | |
|---|---|---|---|
| 123,119 | 5/1948 | Australia | 178/DIG. 12 |
| 875,909 | 8/1961 | Great Britain | 325/430 |

OTHER PUBLICATIONS

"It's a Television First... Receivers with Integrated Circuits" Jack Avins Electronics March 21, 1966 pp. 137–142.

"Color TV Processing Using Integrated Circuits" L. Blaser & D. Bray IEEE Trans. BTR Vol. BTR–12 pp. 54–60, Nov. 1966.

"A Monolithic Wideband Synchronous Video Detector for Color TV" G. Lunn, IEEE Trans. BTR Vol. BTR–15 No. 2 pp. 159–166, July 1969,

*Primary Examiner*—Robert L. Griffin
*Assistant Examiner*—George G. Stellar
*Attorney*—John J. Pederson and John H. Coult

[57] ABSTRACT

An automatic fine tuning and modulation detection arrangement for a color television receiver for automatically obtaining optimum picture presentation and the elimination of quadrature, intermodulation distortion and other undesirable interference components in the processing of the received signal information. Disclosed is an automatic phase locked or control loop interconnected between a point in the intermediate frequency channel and the local oscillator of the receiver's tuner. Automatic fine tuning is obtained by electronically controlling the frequency of the tuner oscillator in relation to the output of a reference oscillator operating at the desired picture carrier frequency. A single synchronous detector is provided in lieu of the several conventional peak or envelope detectors, which synchronous detector is keyed to the action of the phase-locked or APC loop. The circuitry, with the exception of a low pass filter, is designed in integrated form for inclusion on a single monolithic chip.

13 Claims, 7 Drawing Figures

Inventor
Peter C. Skerlos
By [signature]
Attorney

Inventor
Peter C. Skerlos
By [signature]
Attorney

Inventor
Peter C. Skerlos
By [signature]
Attorney

Inventor
Peter C. Skerlos
By [signature]
Attorney

AUTOMATIC FINE TUNING WITH PHASE-LOCKED LOOP AND SYNCHRONOUS DETECTION

BACKGROUND OF THE INVENTION

The present invention relates in general to color television receivers and more particularly to a novel circuit arrangement for effecting automatic fine tuning therefor and the elimination of quadrature distortion as well as intermodulation and other undesirable interference components.

Present day color television transmissions are in accordance with NTSC standards wherein luminance information, representing elemental brightness variations in the televised image, is transmitted on an amplitude modulated main carrier component and the chrominance information, representing color hue and saturation, is transmitted on a phase and amplitude modulated subcarrier. Sound is included in a frequency modulated carrier just above the chroma subcarrier. At the receiver, the luminance and chrominance information is suitably detected, such as by a conventional peak or envelope detector, with the sound information usually being derived by still another such detector. The derived luminance information is applied to appropriate control electrodes of the three electron guns included in the image reproducer, while appropriate chrominance information is suitably demodulated to form separate primary control-control signals for application to still other control electrodes of the image reproducer.

In still another aspect of color television, it is to be noted that the composite video information, while including both sidebands of the chrominance as well as a portion of the luminance, is nevertheless transmitted as vestigial single sideband modulation of the main carrier. In subsequent processing in the color receiver, the chroma components are not amplified at the same levels in the intermediate frequency channel and further equalization is required at some appropriate location in the receiver, such as by tailoring the response of the chroma channel in accordance with known principles and techniques. In any event, such vestigial single sideband modulation gives rise to certain non-linearities in the extracted signal information derived by peak or envelope detectors, when such single sideband modulation is on the order of or greater than the associated carrier. For example, undesirable phase modulation components can be generated, as well as quadrature distortion and other interference conditions, the effects of which will be referred to in more detail subsequently.

In the conventional receiver, program selection is customarily effected by rotating a turret type tuner to the desired channel. However, this only provides relatively broad frequency selection and control. In practice, a fine tuning control is additionally required to accomplish the necessary vernier adjustment and to further correctly position the respective video, chroma and sound information of the received signal at particularized locations with respect to the response characteristic of the receiver's intermediate frequency channel. That is, for optimum reception and image reproduction, the final adjustment of the fine tuning control is made such that the picture carrier is positioned on one side of the IF response characteristic slope, say, at about 6 dB down from flat response, while the chroma subcarrier is located on the slope of the other side at about the same 6 dB point. The sound carrier will then be located at some point further down on the IF response slope at about 50–70 dB from flat response. Accordingly, any significant deviation from the intended predetermined relationships will result in less than optimum picture presentation. Adjusting the fine tuning control so that the picture carrier falls in the flat response portion of the IF characteristic may well result in loss of the chroma information since it will now be located much farther down on the IF slope than before and will be significantly greater attenuated. On the other hand, adjusting the fine tuning control such that the chroma subcarrier falls in the flat response portion of the IF characteristic may result in loss of synchronization due to the significantly greater attenuation of the main carrier as well as visual presentation of a 920 kHz beatnote generated between the chroma subcarrier and the associated sound carrier.

In many instances, the individual incorrectly adjusts the conventional fine tuning control simply because he is unaware of the proper operating conditions for optimum image reproduction. In other instances, reasonably precise adjustment may initially be established, but then lost because of changes in the operating conditions of the receiver after warm-up or long term temperature drifts that occur in various of the components of the receiver. While provisions for automatic frequency control have been included in some prior television receivers, the additional components required result in an undue economic burden on the set manufacturers in a highly competitive industry and further presents yet another user-operated control that can be misunderstood and/or misadjusted.

Accordingly, one object of the present invention is to provide an improved fine tuning arrangement for a color television receiver.

A more particular object of the present invention is to provide a tuning arrangement for a color television receiver wherein a user-operated control includes a first range in which no picture presentation is effected and a second range within which a reproduced image is established under optimum operating conditions for the receiver.

Another object of the present invention is to provide an automatic fine tuning arrangement for a color television receiver wherein electronic control of the tuner local oscillator is provided continuously and automatically to maintain a precise frequency match between the signal carrier and an included reference oscillator.

Yet another object of the present invention is to provide an automatic fine tuning arrangement of the foregoing type which, inter alia, includes a phase-locked loop having a given pull-in range wherein both frequency and phase difference between the signal carrier in the IF and that of a reference oscillator is progressively reduced automatically and further having a hold-in range wherein the correctly matched carrier signal is maintained despite subsequent drifts and other tuning inaccuracies.

It is also to be noted that notwithstanding correct tuning adjustments of the color receiver, still other factors may be present to detract from optimum image and sound reproduction. This is particularly so when employing one or more conventional peak or envelope detector devices for deriving the respective luminance, chrominance and sound information. Such envelope detectors, usually in the form of a diode, are used because of their relative simplicity and low cost. Such detectors, however, give rise to a number of undesirable performance characteristics in the receiver, such as intermodulation (generation of a 920 kHz beatnote) between the chroma and sound carriers, quadrature distortion components resulting in luminance desaturation in the presence of chrominance, intercarrier buzz in the sound channel and, in some cases in the presence of noise interference, loss of horizontal sync. Such spurious or distortion components can be minimized by one method or another. For example, a suitable sound trap may be included in the IF channel to reduce the 920 kHz beatnote. A separate detector device may be used for the sound information in addition to that employed for deriving the luminance and chrominance information. Still other approaches incorporate pass band shaping of one sort or another prior to detection. However, all such means, methods and approaches involve additional component parts and further add to the complexity of the receiver as a whole. Moreover, none of the foregoing effectively counteract the deleterious effects of quadrature distortion and intercarrier buzz inherent in envelope detectors.

Accordingly, it is a further object of the present invention to provide a single detector for simultaneously deriving the luminance, chrominance and sound information, which detection device is unresponsive to the quadrature component of the vestigial sideband transmission of the televised image and which prevents the generation of intermodulation and intercarrier buzz distortion components.

Yet another object of the present invention is to provide a single synchronous detection arrangement for simultaneous detection of sound and composite video from a received signal and wherein such detector is keyed to the automatic tuning action of the included phase-locked loop at the receiver front end.

Still another object of the present invention is to provide a tuning arrangement for a color television receiver which incorporates automatic fine tuning, automatic frequency control and synchronous detection for sound and composite video information derivation and wherein the circuitry thereof is especially suited for inclusion on a single monolithic chip in integrated circuit form.

SUMMARY OF THE INVENTION

In practicing the invention, a fine tuning arrangement including an automatic phase-locked or control loop is provided in the front end of a color television receiver operable between the output of a selected intermediate frequency amplifier and the local oscillator of the associated receiver tuner. In addition, a single synchronous detector is provided in lieu of the several conventional envelope detectors customarily employed for sound and synchronizing pulse information and for luminance and chrominance in the form of a composite video signal.

The phase-locked or APC loop preferably comprises a phase detector for comparing the instantaneous frequency and phase of the signal at the output of the selected intermediate frequency amplifier and a reference oscillator operating at the desired IF picture carrier, or 45.75 mHz. Any differences detected are in the form of a beatnote at the output of the phase detector which is coupled to a low pass filter. If the beatnote frequency is within the pass band of the low pass filter, it is applied to the local oscillator of the tuner. The tuner oscillator is voltage controlled, such as by a varactor or other voltage responsive element, whereby the output frequency of the oscillator is determined by the d-c component of the applied beatnote frequency. The local oscillator is thus electronically adjusted until the output at the selected IF amplifier precisely matches the output frequency of the reference oscillator at a 90° phase differential.

A further output of the reference oscillator is coupled to the synchronous detector through a phase shifter which shifts the phase 90 degrees to effect appropriate synchronous detection of the respective video and sound information. Accordingly, the phase-locked loop provides both automatic fine tuning within a given range, say ± 750 kHz, as well as automatic frequency control to maintain the optimum tuning, once so established. The phase-locked loop further provides precise frequency and phase control required for synchronous detection. The low pass filter employed in the phase-locked loop includes an overall response for extended pull-in capabilities as well as a narrow band region to minimize the effects of noise and phase modulation components at or near lock-up. The circuitry, in its preferred embodiment, is arranged in integrated circuit form for inclusion on a single monolithic chip.

BRIEF DESCRIPTION OF THE DRAWINGS

The features of the present invention which are believed to be novel are set forth with particularity in the appended claims. The invention itself, however, together with further objects and advantages thereof may best be understood by reference to the following description taken in conjunction with the accompanying drawings in which like numerals identify like elements and in which:

DESCRIPTION OF THE PREFERRED EMBODIMENT

Figure 1:
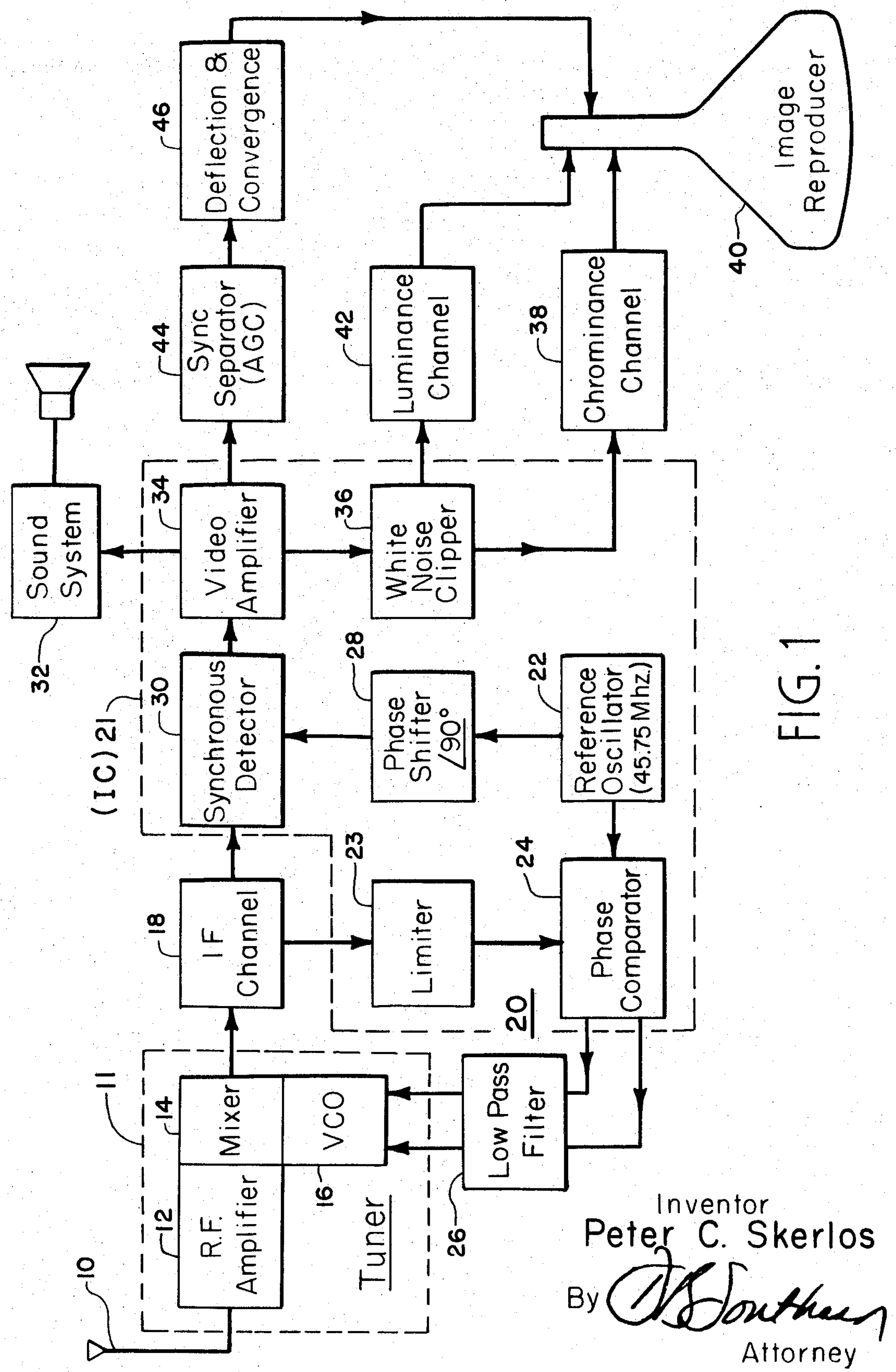
FIG. 1 is a block diagram of a color television receiver constructed in accordance with the present invention.

Referring now to the drawings, a block diagram of a color television receiver embodying a preferred form of the invention is illustrated in FIG. 1. The receiver includes an antenna 10, for receiving a televised signal, coupled to a tuner 11. The tuner 11 may be of the conventional turret type, which includes a radio-frequency (RF) stage 12 having one or more amplifiers, a mixer stage 14 which converts the received signal to an intermediate frequency in the presence of an applied signal from a voltage-controlled local oscillator 16. The output of the mixer 14 is applied to an intermediate-frequency (IF) channel 18 having one or more suitable amplifiers.

Under existing television transmission standards, each television channel occupies a total bandwidth of approximately 6 mHz and the transmitted television signal includes two different RF carriers separated in the frequency spectrum by 4.5 mHz. The lower frequency carrier is vestigial sideband modulated by the brightness or luminance information and also by a 3.58 mHz subcarrier which has been previously phase and amplitude modulated by the color or chrominance information. The higher frequency RF carrier is frequency modulated by the sound or audio information. In accordance with the superheterodyne technique, the two received RF carriers of the selected channel are beat or heterodyned with the local oscillator in the tuner 11 to produce an intermediate frequency signal at the output of the mixer 14 which includes an amplitude modulated IF picture carrier having modulation components conveying luminance information, a phase and amplitude modulated color IF carrier having modulation components conveying color information, and a frequency modulated sound IF carrier having modulation components conveying audio information. The color and sound IF carriers have fixed frequency separations of approximately 3.58 and 4.5 mHz respectively from the IF picture carrier. The precise frequencies of the IF carriers are determined by the operating frequency of the tuner local oscillator. In accordance with the present industry practice, when the RF tuner is properly tuned to receive a television signal representing a program in color, the local oscillator 16 will be operating at a frequency appropriately higher than both of the received RF carriers to establish the sound IF carrier at 41.25 mHz, the color IF carrier at 42.17 mHz, and the picture IF carrier at 45.75 mHz. The modulation sidebands of the color carrier most frequently used for detection of the chroma information cover the frequency range from 41.67 to 42.67 mHz.

Figure 2:
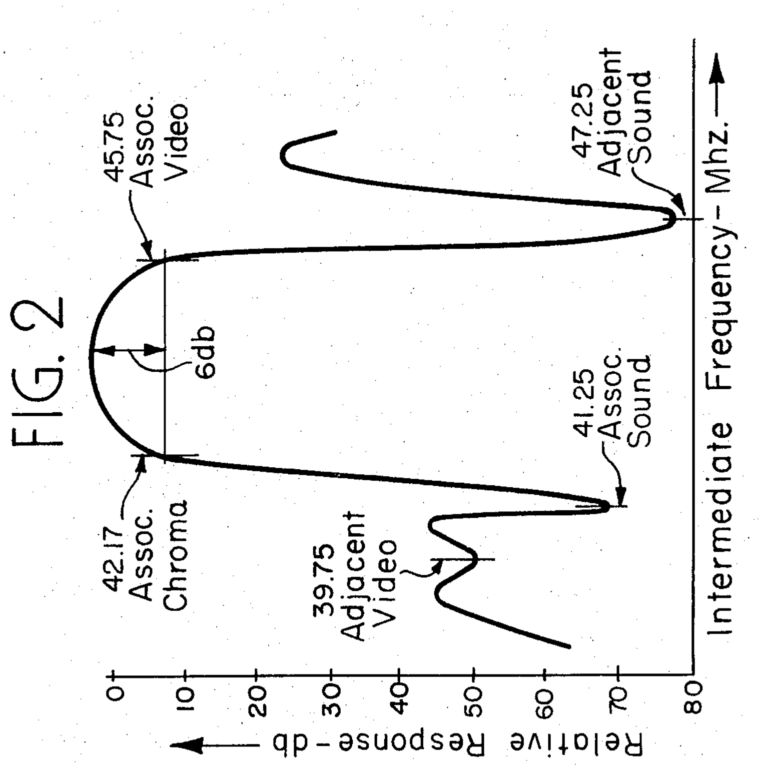
FIG. 2 is a graphic illustration of the response characteristic for the intermediate frequency channel of a television receiver useful in understanding the present invention.

However, merely converting the incoming RF signal into an appropriate intermediate frequency signal will not of itself suffice for optimum image reproduction. In addition to the necessary amplification of the converted signal, the pass band or response of the IF channel 18 as a whole must also be shaped or modified in a particularized manner so that the various carriers and in turn their modulation components are weighted each to the other in accordance with known principles prior to suitable detection. In particular, the response characteristic of the IF channel 18 at the luminance detector is tailored to be on the order as illustrated graphically in FIG. 2. At optimum operating conditions, the picture or video carrier at 45.75 mHz is positioned at a point approximately 6 dB down on the higher frequency slope of the response curve which places the color IF carrier at approximately the same level on the lower frequency slope and the sound IF carrier some 50–70 dB farther down. The adjacent picture IF carrier and adjacent sound IF carrier will be attenuated on the order as depicted in FIG. 2.

As previously pointed out, any substantial deviation from the foregoing defines optimum tuning condition for the receiver will result in distortion of one sort or another with attendant degradation in the reproduced color image. Adjusting the tuning of the receiver so that the picture carrier is located substantially in the flat portion of the IF response characteristic will result in undesirable attenuation of the color modulation components since the color carrier will fall farther down on the response slope as viewed in FIG. 2. On the other hand, adjusting the receiver tuning so that the color carrier falls within the flat portion of the IF response may well result in objectionable loss of luminance information, excessive color saturation and inter-modulation between color and sound modulation components. It is thus apparent that it is desirable to adjust the tuning of the receiver so that the relative positions of the various carriers within the IF response are substantially as depicted in FIG. 2. It is even more desirable to effect such tuning automatically and, once so established, to maintain such optimum tuning over a range of signal variations and operating conditions.

The receiver as shown in FIG. 1 provides such automatic fine tuning and differs principally from prior art configurations by the inclusion of a phase-lock or automatic phase control (APC) loop 20 operating with particularized performance characteristics in conjunction with a single synchronous detector stage 30. The APC loop 20 extends between a reference oscillator 22 and the local oscillator 16 of the RF tuner 11. The APC loop 20 comprises, in addition to the reference oscillator 22, a phase detector or comparator 24 and a low pass filter network 26. The phase detector 24 receives one input signal from an IF amplifier stage in IF channel 18 and another input signal from the reference oscillator 22. The output of the phase detector 24 is coupled to the low pass filter 26, the output of the latter being, in turn, coupled to the local oscillator 16 of tuner 11. The reference oscillator 22 is further coupled to the synchronous detector 30 through a phase shifter 28 which effects a 90 degree phase shift in the applied signal.

The remaining portion of the color television receiver, with one exception, is of substantially conventional design and, accordingly, a relatively brief reference to the general operating characteristics thereto should suffice. Specifically, the detected composite video signal containing luminance and chrominance information together with similarly detected sound and sync information appears in the output signal of synchronous detector 30. The sound information is coupled to a separate sound system 32 at a suitable take-off point while the composite video signal is suitably amplified in a video amplifier stage 34 and coupled to a white noise clipper network 36, the details of which will be described in more detail subsequently. Chrominance information in the composite video signal is coupled to a chrominance channel 38 where suitable color-drive signals are developed in a manner known in the art and applied to appropriate electrodes of the receiver's image reproducer 40. The luminance information at the output of the white noise clipper 36 is coupled to a luminance channel 42 which develops the brightness level signals for application to still another control electrodes of the image reproducer 40. Additionally, the video amplifier stage 34 is further coupled to a sync separator 44 where suitable synchronizing pulses are derived in a known manner and applied to a deflection and convergence stage 46 containing suitable horizontal and vertical deflection circuits or scanning generators as well as the necessary high voltage supply. For convenience, stage 44 is further shown to include provisions for automatic gain control (AGC) action customarily provided in television receivers, the operation of which is likewise known in the art.

The various output signals from the scanning generators and high voltage supply in stage 46 are likewise applied to the receiver image reproducer which, in conjunction with the derived luminance and chrominance signals, result in a televised image being reproduced on the screen of tube 40 having the correct brightness, saturation and hue representations.

In operation, tuner 11 is rotated to a selected channel. For illustrative purposes, it may be assumed that the tuning effected initially deviates to some degree from the precise optimum. For example, the voltage-controlled local oscillator (VCO) 16 may be assumed to be at a frequency which heterodynes with the received carrier in mixer stage 14 to produce an IF picture carrier at about 46.25 mHz. This, of course, is some 500 kHz higher than the desired frequency of the IF picture carrier of 45.75 mHz. With the reference oscillator 22 fixed tuned to the desired 45.75 mHz frequency, it will be readily understood that the output of the phase detector 24 will be a beatnote signal at the 500 kHz difference frequency, of an essentially sinusoidal nature, which beatnote signal is coupled to the input of the low pass filter 26. The filter 26 has a pass band effective to pass the 500 kHz beatnote signal and thus apply the same to the VCO 16 of the tuner 11. Accordingly, the VCO 16 is frequency modulated by the beatnote signal which when coupled back into the APC loop 20 causes the output of the phase detector 24 to be the product of a sine wave and a frequency modulated wave. Since the modulating frequency is equal to the beat frequency, the resultant beatnote signal is now no longer precisely sinusoidal. That is, there is a d-c component present and it is this d-c component which causes the output frequency of the VCO 16 to slowly change in a direction to reduce the detected difference between the heterodyned IF picture carrier and that of the reference oscillator 22 operating at the desired IF picture carrier, or 45.75 mHz. The VCO 16 continues to change until the generated IF picture carrier at the output of the IF stage 18 is the same in both frequency and phase and will remain in such condition despite temperature drifts and other variations that would otherwise result in mistuning. This maintenance of frequency match is referred to as "lock-up" while the change in VCO frequency to reach such condition is customarily referred to as the "pull-in" range of the phase-locked APC loop.

Figure 5:
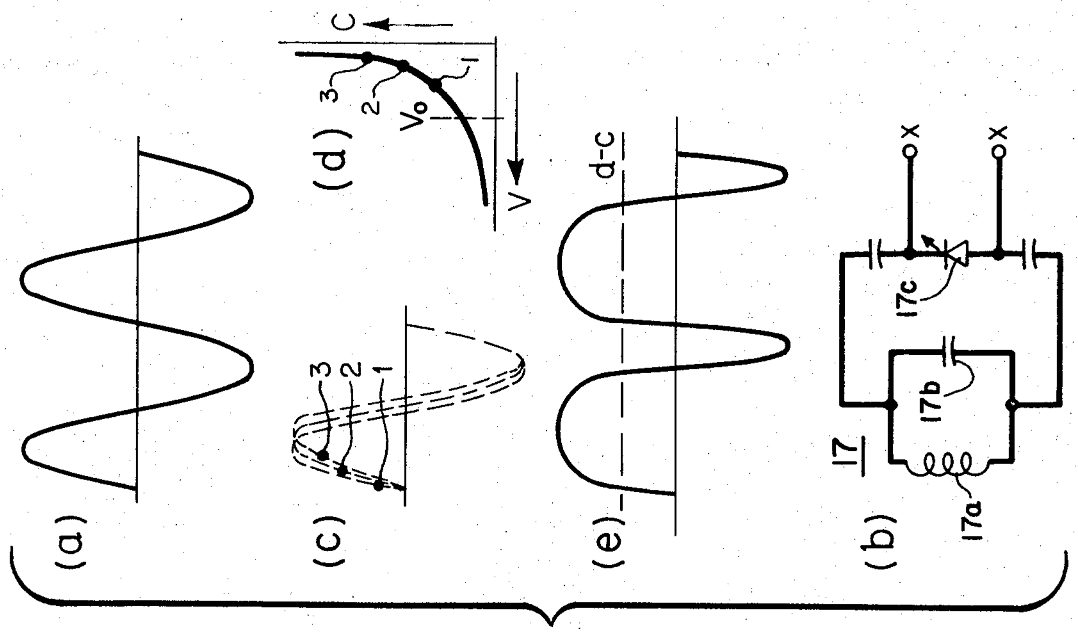
FIGS. 5a through 5e are appropriate waveform representations and simplified circuitry illustrating the pull-in characteristics of the tuner local oscillator by the action of the phase-locked loop.

The pull-in behavior of the phase-locked loop 20 may be more readily appreciated by reference to the respective waveforms depicted in FIGS. **5*a* through 5*e*. FIG. 5*a* represents the sinusoidal beatnote that would be generated by the phase detector 24, if the loop 20 is open, on the difference between the output of the reference oscillator 22 and the IF picture carrier as initially heterodyned in mixer stage 14, or in the assumed example, 500 kHz. A portion of the circuitry for VCO 16 is shown in simplified form at 17 in FIG. 5*b*. The tank circuit formed by inductance 17*a* and capacitance 17*b* may be taken as presenting the frequency determining elements of the oscillator 16 as a whole. A voltage responsive element, such as the varactor 17*c*, is coupled in parallel with the tank circuit 17*a*–17*b* which when subjected to a control voltage alters the frequency response of the latter and thus the output frequency of the oscillator 16. The control voltage may be applied across the varactor 17*c* such as at terminals designated at "X" to provide a balanced drive. FIG. 5*d* represents the capacitance characteristics exhibited by varactor 17*c*** when subjected to a varying control voltage.

Varactor **17*c* is initially biased at some selected reference level to provide a fixed capacitance, such as represented at $V_o$. When, however, the beatnote signal as depicted in FIG. 5*a* is applied at terminal X, the capacitance exhibited by varactor 17*c* is varied in accordance therewith and in turn causes the response of the tuned circuit 17*a*–17*b* to likewise vary. Specifically, when the voltage of the applied beatnote waveform reaches, say point 1 in FIG. 5*c*, the change in capacitance in varactor 17*c* (point 1 in FIG. 5*d*) likewise effects a change in the response of tuned circuit 17*a*–17*b*. At point 2 in FIG. 5*c* there is a further change in exhibited capacitance of varactor 17*c* and, at point 3, still another change. In the illustrated example, this effects a decrease in frequency as the beatnote signal at terminals X swings in the positive direction, but an increase in frequency as the beatnote signal travels through a negative swing. The resultant waveform modulating the VCO 16 is that as depicted in FIG. 5*e*. This control signal is non-sinusoidal in nature and includes a d-c component as represented by the horizontal dotted line. The d-c component results in the VCO 16 changing in frequency in a direction to progressively reduce the detected difference between reference oscillator frequency and the IF carrier frequency until lock-up occurs. At lock-up, the signal generated by phase comparator 24 is essentially d-c in nature. Any change in the output frequency of the VCO 16 (temperature drifts, component values shifting, or the like) or in the frequency of the received carrier, will result in a d-c voltage being generated to counteract any detected differences in the foregoing manner. Automatic fine tuning control, or frequency lock, is lost when the detuning is so severe that the static phase error between the output of the reference oscillator 22 and the monitored IF signal carrier is 90** degrees or greater.

Figure 3:
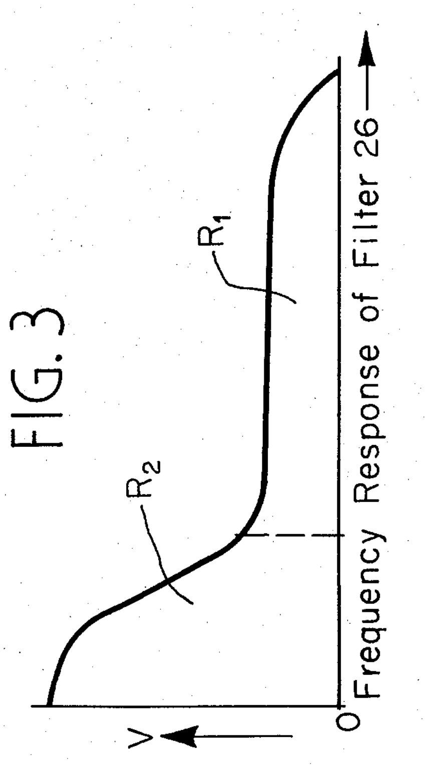
FIG. 3 is a graphic illustration of the bandpass response of the low pass filter also useful in understanding certain aspects of the present invention.

A significant factor in obtaining the desired performance characteristics for the APC loop 20 as a whole resides in the action provided by the associated low pass filter 26. As shown in FIG. 3, filter 26 is designed to exhibit an essentially dual response characteristic comprising a first, extended range of a predetermined response, identified generally at $R_1$, and a second, but substantially narrower range of increased response, identified at $R_2$. At beatnote frequencies within the response range $R_1$, the change in the output frequency of the VCO 16 is effected on a gradual basis, as previously described, so as to permit the required remote pull-in capability. At frequencies within the relatively narrower range or passband $R_2$, however, the higher d-c component in the generated error signal, together with the increased filter response, provides for rapid pull-in and lock-up for the loop 20.

In addition to enhancing pull-in capabilities for the loop 20, the tailored filter response within pass range $R_2$ further minimizes the otherwise deleterious effects of undesirable noise and phase distortion components within loop 20, and in turn the signal information processed in IF channel 18. Phase distortion arises by reason of vestigial sideband transmission employed for the video information in conjunction with the processing techniques utilized in the television receiver. In the referenced vestigial sideband transmission, both sidebands of the luminance signal are transmitted at the lower frequencies, say for example, zero to 750 kHz, while only single sideband modulation is employed for the luminance information above the 750 kHz level. Such low frequency sidebands of the luminance signal, however, are not amplified at the same level within the IF channel of the receiver because of the tailored response characteristic as depicted in FIG. 2. The resultant attenuation of certain of the luminance signal information components consequently gives rise to phase distortion components of one degree or another over the nominal range of double sideband modulation extending up to about 750 kHz. While the filter 26 itself must operate over a substantial portion of the 750 kHz range, the response at the higher frequency region ($R_1$) is nevertheless substantially reduced as compared to that within the narrower pass range $R_2$. Accordingly, it will be seen that such inherent phase distortion, as well as any noise components, within the filter response range $R_1$ are effectively attenuated with the loop 20 operated at or near lock-up. In practice, filter 26 has been found to provide satisfactory operation over the nominal 750 kHz range when the pass range $R_1$ shown in FIG. 3 is on the order of one-tenth or less than that of its overall response characteristic. It is to be understood, however, that such design guidelines are intended solely for purposes of illustration and not as limitations in any way.

Once lock-up is achieved for loop 20, the respective input signals to the synchronous detector 30 are in proper phase relation to provide synchronous detection of the various modulation components conveying the synchronization, sound, luminance and chrominance information. The proper in-phase relationship between respective input signals to detector 30 is effected by virtue of IF picture carrier being locked to the output signal of the reference oscillator 22, operating at the desired 45.75 mHz picture carrier frequency, with the oscillator 22 itself forming the other input to detector 30. The signal inputs to detector 30 are thereafter maintained in the required in-phase relationship by the action of the APC loop 20, as previously described.

Synchronous detection has a number of advantages over the conventional peak or envelope detector device as made mention previously. A particularly troublesome aspect of the typical envelope detector is its inherent response to quadrature components present in the transmitted television signal, resulting in a number of degradations in the reproduced color image. The synchronous detector on the other hand is unresponsive to such quadrature components and thus does not generate quadrature distortion. Nor does such detector give rise to various undesirable intermodulation products customarily produced by envelope detectors.

Figure 4:
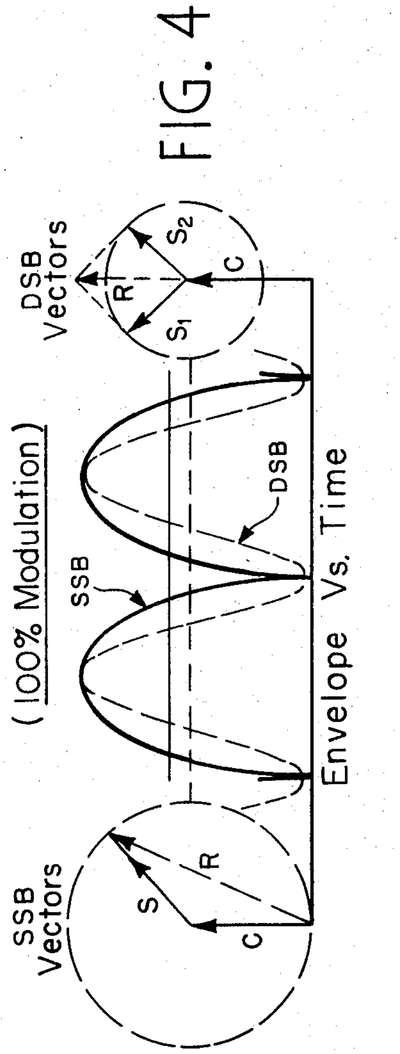
FIG. 4 is a graphic representation of modulation waveforms and vectors for single and double sideband modulation which illustrates the generation of quadrature distortion components.

The effect of quadrature distortion can be more readily appreciated by reference to FIG. 4. As noted hereinbefore, video information in the television signal is transmitted as a vestigial sideband modulation in accordance with U. S. standards. The basic problem in envelope detection of such a partial single sideband modulated carrier signal is graphically represented by the beatnote waveforms referenced in FIG. 4. The envelope vs. time waveforms for double sideband transmission (DSB) as well as for single sideband (SSB) are illustrated for 100 percent modulation and can be directly deduced from the vector diagrams at the respective sides thereof. The symbol C denotes the carrier vector, the symbol S the sideband component or components, and the symbol R the resultant vector. From the illustrated envelope waveforms it will be seen that the quadrature component for DSB modulation effectively cancels while the same obviously is not true for the SSB case. Accordingly, the average value of the waveform is thus greater for SSB (solid horizontal line) as compared to that for DSB modulation (dotted line). Additionally, it will be observed that the waveform for SSB is distorted because of the presence of the quadrature component in the output which produces harmonics and a reduced amplitude of fundamental frequency component. This means that the susceptibility of the envelope detector to quadrature distortion components results in a reduction in the detected luminance signal level due to the presence of chrominance information, a reduction in detected chrominance signal level, and production of harmonics of the luminance signal frequency that may fall within the chrominance band and give rise to false chroma.

Still another disadvantage of the envelope detector is its susceptibility to generating undesirable intermodulation products between various of the carriers in the converted IF signal. For example, intermodulation may occur between the chroma and sound carriers giving rise to an objectionable 920 kHz beatnote which, without more, may be visually reproduced on the screen of the television picture tube. Still another interference component, usually referred to as intercarrier buzz, may arise due to intermodulation between the sound and picture carriers and is rendered audible in the receiver's audio system. Some degree of compensation can be effected with respect to the 920 kHz beatnote, usually in the form of one or more sound traps (41.25 mHz) selectively positioned in the IF channel. Such traps, however, constitute a calculated compromise in the overall processing of signal information and, in any event, require additional components and additional cost for the television receiver.

While the 920 kHz beatnote can in most instances be sufficiently suppressed, the same is not true with respect to intercarrier buzz interference. This is because of the inherent nature of the latter type of intermodulation product. Intercarrier buzz arises from undesirable phase modulation on the 4.5 mHz intercarrier signal by video information, for instance, due to the phase modulation present on the picture carrier in the region of the slope of the video IF characteristic. The buzz components are especially manifested at baseband and are in the form of sidebands of the horizontal line frequency (15.75 kHz), spaced at 60 cycle intervals. Those components within the audio range, say up to about 15 kHz, are thus rendered audible upon transference to the conventional 4.5 mHz sound signal effected by intermodulating the 45.75 mHz picture carrier and the 41.25 mHz sound carrier.

Moreover, the generation of intercarrier buzz presents an even greater problem with respect to stereo audio systems for television. This is because the audio frequency range for such sound system must be extended (for the required left and right audio channels) and an additional subcarrier is required, preferably at or about twice the horizontal line frequency (15.75 kHz × 2, or 31.5 kHz). Accordingly, the greater frequency range encompasses a greater area of buzz components, i.e., harmonics of the fundamental line frequency sidebands, which are likewise rendered audible and thus degrading receiver performance even further. Synchronous detection on the other hand simply does not generate such intermodulation interference components and is therefore particularly suited to television stereo audio applications.

In still another aspect, synchronous detection has the advantage of an improved response in the presence of noise interference. RF noise pulses that are in the whiter-than-white direction can of course cause a 180° phase reversal of the carrier signal. In an envelope detector, the maximum amplitude of the white pulses corresponds to zero carrier level; beyond the referenced 180° phase reversal, whiter-than-white RF pulses are rectified to go into the black direction. With synchronous detection, such pulses continue on in the whiter-than-white direction. Consequently, in the envelope detector, this phase reversal can and frequently does give rise to false sync components if the whiter-than-white pulses are of sufficient amplitude upon being reversed in phase to become blacker-than-black information. Moreover, the whiter-than-white noise interference that is present in synchronous detection is readily eliminated by a relatively simple expedient at a location within the receiver without impairing the operation of the sync separator circuitry. This can be more readily appreciated by reference to FIG. 6.

FIG. 6*a* illustrates a portion of the receiver including the synchronous detector 30, video amplifier 34 and sync separator 44 in block form and the white noise clipper 36 in somewhat simplified schematic form. A detected composite video signal at the output of the synchronous detector 30 may be assumed to be that as shown in FIG. 6*b* which includes a noise pulse $N_1$ occurring at a sync pulse location and a further noise pulse $N_2$ within the video portion of the signal. Both pulses may be assumed to be of sufficient magnitude to extend into the whiter-than-white region located between the maximum white level identified at Y and zero carrier represented by the solid line O. The level designated at Z represents the blanking level for stripping off the sync and blanking information in sync separator stage 44.

Figure 6:
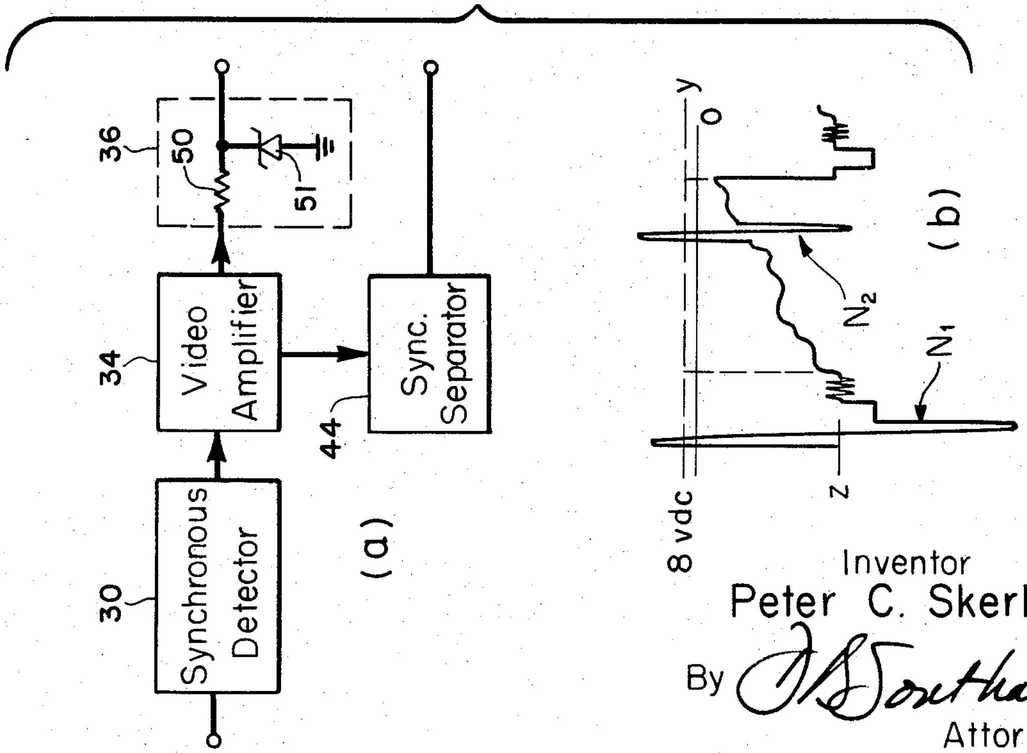
FIGS. 6a and 6b represent simplified circuitry and representative waveforms illustrative of the whiter-than-white noise elimination effected in one aspect of the invention.

Accordingly, the signal as depicted in FIG. 6 from synchronous detector 30 will be amplified in video amplifier 34 and coupled to the white noise clipper stage 36. A portion of the amplified signal from video amplifier 34 is also coupled to the sync separator 44. Noise clipper 36 may comprise a series resistance 50 and a zener diode 51 interconnected in the manner shown. Diode 51 is selected so that it conducts at a potential level approximating maximum white level (Y) and any noise interference extending into the whiter-than-white region is thus effectively eliminated, thereby enhancing the overall color image reproduction.

It is to be emphasized that the elimination of the whiter-than-white noise in the composite video signal is effected at a location subsequent to that portion of the signal as applied to the sync separator. Accordingly, the average d-c level of the applied signal remains unchanged regardless of whether or not there are noise impulses superimposed thereon. On the other hand, if whiter-than-white noise were eliminated prior to the application of the composite video signal to the sync separator 44, the effective d-c level of the noise would no longer be zero, thereby altering the d-c level of the applied composite video signal as a whole. A change in the d-c level of the applied signal would in turn affect the level at which the blanking and synchronizing pulse information is stripped from the composite video signal in separator 44 and may give rise to false or insufficient sync information. In the present system, however, phase reversal of the carrier on strong noise interference is avoided by synchronous detection, whiter-than-white noise is eliminated from the video channel for improved picture presentation and the operation of the sync separator is maintained at its optimum operating condition for improved sync stability in the presence of noise.

It might also be observed at this juncture that synchronous detection per se is known in the art. Synchronous detection of course has been utilized in the color demodulation circuitry of the color receiver. However, synchronous detection has not heretofore been utilized in the detection of modulation components of the converted IF carrier signal because of the significantly higher costs involved as well as the additional complexity in providing the proper phase and frequency control of the input signal information to such detectors. In the present system, both drawbacks are effectively circumvented. A single synchronous detector replaces the several envelope detectors of the prior receivers along with the required sound trap to effect adequate suppression of the 920 kHz beatnote. More significantly, the synchronous detection in the present system is automatically keyed to the action of the associated APC loop 20 so that the required frequency and phase relationships between the signal information as applied to the signal detector 30 are correctly maintained at all times. No other control circuitry is required. An additional significant feature of the present system is that the APC loop 20, in addition to providing automatic fine tuning facilities, further also exhibits a lock-in or holding action thereby eliminating the need for automatic frequency control (AFC) in conventional receivers and thus reduces manufacturing costs even further.

Figure 7:
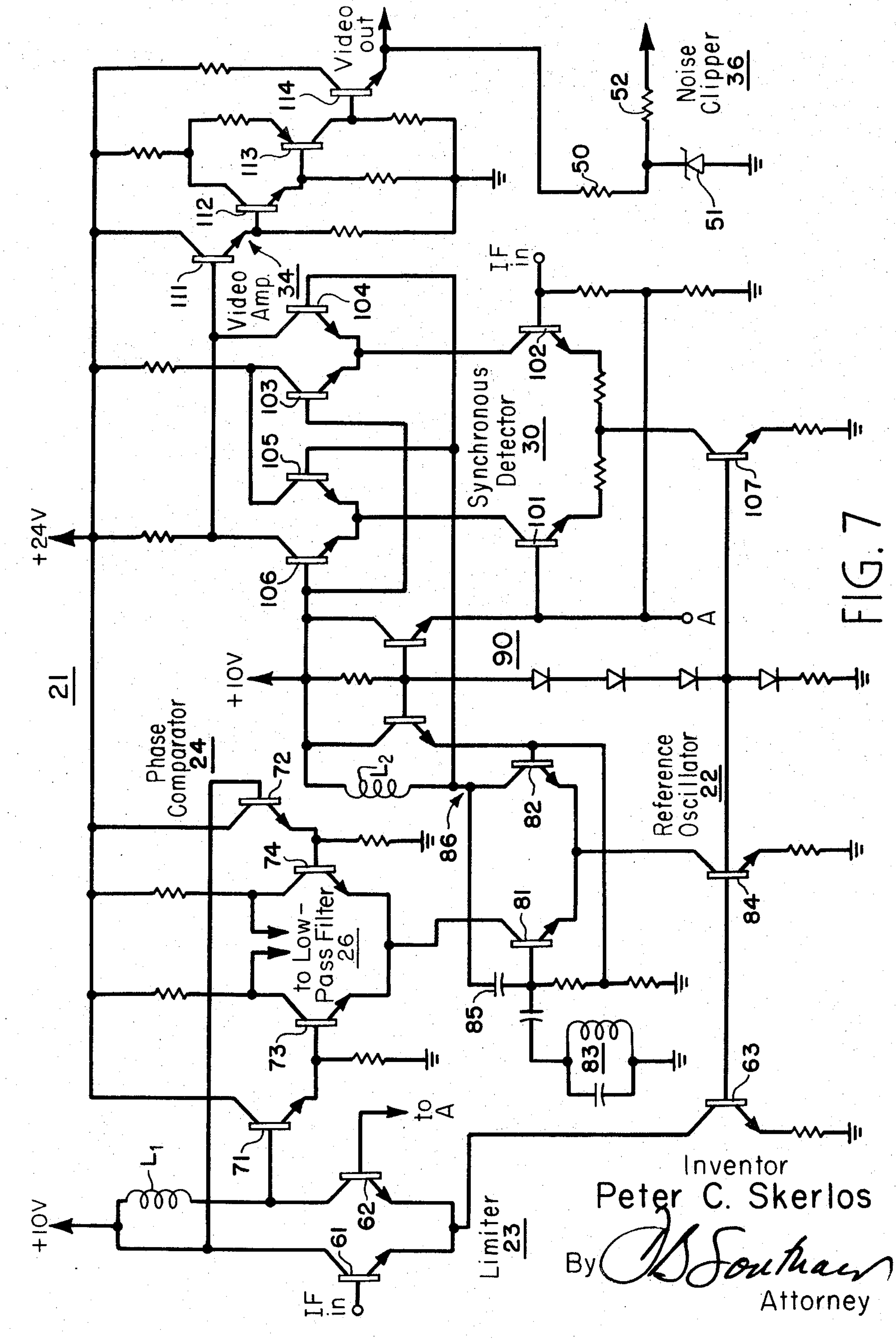
FIG. 7 is a schematic diagram of a combined synchronous detection and phase-locked loop in integrated circuit form in accordance with the present invention.

A detailed circuit found to provide satisfactory operation in accordance with the teachings of the present invention is shown schematically at 21 in FIG. 7. As indicated, the circuit includes a limiter stage 23, phase comparator 24, reference oscillator 22, synchronous detector 30, video amplifier 34, and noise clipper 36. With the exception of the inductances $L_1$ and $L_2$, and the tuned circuit 83, the circuitry and component elements are designed in integrated circuit form for inclusion on a single substrate chip.

Limiter 23 is formed by a pair of transistors 61 and 62 interconnected as a differential amplifier. The IF signal from IF channel 18 is applied to the base of transistor 61 while the base of transistor 62 is tied to a point of reference bias, as designated at A. A further network 90 serves as an intercircuit power supply to establish various of the fixed operating bias requirements. The emitters of transistors 61 and 62 are connected to a constant current source formed by transistor 63 as shown while the collector electrodes of transistors 61 and 62 serve as the respective output connection points for the limiter stage 23.

Phase comparator 24 is formed by a pair of transistors 73 and 74 likewise connected in a differential amplifier configuration with a further pair of transistors 71 and 72 serving as drivers or buffers for transistors 73 and 74, respectively. Accordingly, one signal input constituting the IF carrier signal, and appearing at the respective outputs of limiter 23, is applied through the associated driver transistors 71 and 72 to each of the base electrodes of transistors 73 and 74 as indicated, while the other reference signal, from oscillator 22, is applied to the emitter electrodes of transistors 73 and 74 connected in common. Any detected frequency or phase differences between the respective signals appear as a beatnote signal or essentially d-c control voltage at the respective collector electrodes in the manner previously described, and in turn coupled to the low pass filter 26, shown in FIG. 1.

The reference oscillator 22 is formed by a pair of transistors 81 and 82 connected in differential amplifier configuration, with an additional transistor 84 serving as a constant current source. The frequency determining elements thereof comprise the parallel tuned circuit 83, interconnected in the base circuit of transistor 81, together with the inductance element $L_2$ in the collector circuit of transistor 82. The required feedback for oscillator 22 is effected through the capacitor 85, the base-emitter circuit of transistor 81, and the emitter-collector circuit of transistor 82.

The synchronous detector 30 is formed by a pair of transistors 101 and 102 connected in differential amplifier configuration as shown, each of which feeds a further pair of similarly connected transistors 103–104 and 105–106. A further transistor 107 serves as a constant current source. The IF carrier signal from IF channel 18 is applied to the base electrode of transistor 102 with the outputs at the collector electrodes of transistors 101 and 102 selectively connected to the emitter circuits of transistors 103–104 and 105–106. The required output from the reference oscillator 22 is taken at the collector electrode of transistor 82 and fed to the base electrodes of transistors 104 and 105 connected in common. The base electrodes of the transistors 103 and 106 are connected to a source of unidirectional potential as indicated. Accordingly, synchronous detector 30 is of the doubly balanced type wherein the positive portion of the detected modulation components appear at the collector electrodes of transistors 103 and 105 in the form of a composite video signal with the negative portion appearing at the collector electrodes of transistors 104 and 106. In the illustrated example, the television receiver requires a negative going composite video signal and thus the output from the synchronous detector 30 is taken at the junction of the collector electrodes of transistors 104 and 106.

Video amplifier 34 comprises a plurality of transistors 111, 112, 113, and 114 connected in cascade to effect the required level of amplification. In addition, transistors 111, 112 and 114 are of the n-p-n type while transistors 113 is of the p-n-p type to effect a step down in the d-c level of the detected video signal at the input to transistor 111 of approximately 15 volts to one on the order of 8 volts at the output of transistor 114. White noise clipper 36 is shown in simplified schematic form comprising series resistances 50 and 52, and zener diode 51, the operation of which was described previously.

While a particular embodiment of the invention has been set forth and described herein, it will be obvious to those skilled in the art that certain changes and modifications may be made without departing from the invention in its broader aspects and, accordingly, the aim in the appended claims is to cover all such modifications and changes as fall within the true scope and spirit of the present invention.

What is claimed is:

1. In a color television receiver apparatus having a tuner for amplifying and converting a radio frequency carrier signal on a selected television channel and modulated by chroma, picture and sound information to one of an intermediate frequency by the action of a mixer and a variable frequency, voltage controlled local oscillator, an automatic fine tuning and modulation detection arrangement unresponsive to quadrature distortion components, in integrated circuit form, comprising in combination:

a limiter formed by a pair of transistors connected in differential amplifier configuration having a first input, a second input coupled to a point of reference potential, and a pair of outputs;

low pass filtering means coupled to the tuner local oscillator for selectively controlling the output frequency thereof;

a phase comparator formed by a pair of transistors in differential amplifier form having a pair of inputs selectively coupled to the outputs of said limiter, a pair of outputs coupled to said low pass filtering means, and a pair of common electrodes connected in common;

a reference oscillator formed by a pair of transistors connected in differential amplifier configuration having frequency determining elements for rendering an output thereof operative at a predetermined video frequency;

a doubly balanced synchronous detector formed by first, second and third pairs of transistors having input, output and common electrodes, the respective outputs of said first transistor pair being connected to said common electrodes of said second and third pairs of transistors connected in common, respectively;

means for applying said converted intermediate frequency carrier signal to said first input of said limiter and also to one input of said first transistor pair forming said synchronous detector; and means for coupling the output of said reference oscillator to said common electrodes of said phase comparator and to a selected one of said inputs of each of said second and third transistor pairs of said synchronous detector, the other of said inputs to each of said first, second and third transistor pairs forming said synchronous detector being connected to said point of reference potential.

2. In a color television receiver apparatus having a tuner for amplifying and converting a radio frequency carrier signal modulated by signal components including chroma, picture and sound information on a selected television channel to an intermediate frequency signal by the action of a mixer and a variable frequency voltage-controlled local oscillator, and having an intermediate frequency amplifier which exhibits a predetermined frequency bandpass characteristic in which each of said signal components is assigned a predetermined location for weighted amplification thereof, an automatic fine tuning and modulation detection system for accurately positioning the signal components of a converted carrier within the frequency bandpass of the intermediate frequency amplifier while eliminating quadrature distortion and intercarrier buzz, comprising in combination:

a phase-locked control loop, including phase comparator means receiving the converted intermediate frequency signal from the intermediate frequency amplifier, and low pass filtering means, coupled to the tuner local oscillator for selectively controlling the output frequency thereof;

a synchronous detector receiving the converted intermediate frequency signal from the intermediate frequency amplifier;

a reference oscillator coupled to the phase comparator means and to the synchronous detector for supplying each with a reference oscillator signal at a predetermined video frequency; and phase shift means for shifting the relative phase of the reference oscillator signal and the intermediate frequency signal by 90° so as to establish a substantially zero degree phase difference between the reference oscillator and intermediate frequency signal inputs to the synchronous detector, the frequency of the reference oscillator signal being selected to cause the phase comparator means to achieve a condition of phase lock such that said oscillator and intermediate signal inputs thereto have a relative phase difference of substantially 90° and such that the local oscillator causes the converted chroma, picture and sound signal components to be accurately positioned at their predetermined frequency locations in the frequency bandpass of the intermediate frequency amplifier.

3. An automatic fine tuning and modulation detection arrangement in accordance with claim 2 wherein said low pass filtering means exhibits an essentially dual frequency response characteristic comprising a first, extended range of a given response level and a second, substantially narrower range having an increased response with respect to said given response level.

4. An automatic fine tuning and modulation detection arrangement in accordance with claim 3 wherein said second narrower range of increased response comprises the low frequency portion of the overall frequency response characteristic of said low pass filtering means.

5. An automatic fine tuning and modulation detection arrangement in accordance with claim 4 wherein the overall response range of said low pass filtering means is approximately 750 kHz with said narrow range exhibiting said increased response characteristic encompassing less than one-tenth said overall response range.

6. An automatic fine tuning and modulation detection arrangement in accordance with claim 2 wherein an error signal is generated at the output of said phase comparator on detected differences between the applied intermediate frequency carrier signal and the signal applied from the reference oscillator, and further wherein said error signal is in the form of an alternating current non-sinusoidal beatnote having a direct current component at frequencies removed from said desired video frequency, with said error signal changing to one of essentially direct current when said phase-locked loop is operating at or near lock-up at said desired video frequency.

7. In a television receiver having a tuner for converting a selected radio frequency carrier signal modulated with luminance signal information, processing signal information and fortuitous noise components to one of an intermediate frequency, said television receiver including a luminance signal information channel and a signal processing channel which includes sync separator means and automatic gain control means, a video detection and noise suppression system comprising:

a synchronous detector having an input circuit for receiving said intermediate frequency signal and an output circuit, said synchronous detector demodulating all of said information and noise components;

noise suppression means coupled between the output circuit of the synchronous detector and said luminance signal information channel for reducing the noise components presented to said luminance signal information channel; and means connecting the output of the synchronous detector to said signal processing channel, thus providing the sync separator means and automatic gain control means with a demodulated video signal containing unsuppressed noise components while the luminance signal information channel receives the video signal with the noise components suppressed.

8. In a television receiver as set forth in claim 7 wherein said noise signal information in the output of said synchronous detector is bipolar, and wherein said noise signal reducing means passes noise information of substantially one polarity only.

9. In a television receiver as set forth in claim 8 wherein said noise signal reducing means comprises a zener diode coupled across said luminance signal information channel.

10. In a color television receiver apparatus having a tuner for amplifying and converting a radio frequency carrier signal modulated by signal components including chroma, picture and sound information on a selected television channel to an intermediate frequency signal by the action of a mixer and a variable frequency, voltage-controlled local oscillator, and having an intermediate frequency amplifier which exhibits a predetermined frequency bandpass characteristic in which each of said signal components is assigned a predetermined location for weighted amplification thereof, an automatic fine tuning, synchronous detection and white noise suppression system for accurately positioning the signal components of a converted carrier within the frequency bandpass of the intermediate amplifier while eliminating quadrature distortion and intercarrier buzz and providing a noise-suppressed video signal for use in a video processing channel, comprising in combination:

a phase-locked control loop, including phase comparator means receiving the converted intermediate frequency signal from the intermediate frequency amplifier, and low pass filtering means, coupled to the tuner local oscillator for selectively controlling the output frequency thereof;

a synchronous detector receiving the converted intermediate frequency signal from the intermediate frequency amplifier;

a reference oscillator coupled to the phase comparator means and to the synchronous detector for supplying each with a reference oscillator signal at a predetermined video frequency;

phase shift means for shifting the relative phase of the reference oscillator signal and the intermediate frequency signal by 90° so as to establish a substantially zero degree phase difference between the reference oscillator and intermediate frequency signal inputs to the synchronous detector, the frequency of the reference oscillator signal being selected to cause the phase comparator means to achieve a condition of phase lock such that said oscillator and intermediate signal inputs thereto have a relative phase difference of substantially 90° and such that the local oscillator causes the converted chroma, picture, and sound signal components to be accurately positioned at their predetermined frequency locations in the frequency bandpass of the intermediate frequency amplifier;

a video processing channel;

a sync separation and processing channel;

noise suppressing means for suppressing whiter-than-white noise above a predetermined reference level;

means for coupling the output of said synchronous detector to said sync separation and processing channel and also to said noise suppressing means; and means for coupling the output of said noise suppressing means with whiter-than-white noise suppressed to said video processing channel.

11. Automatic fine tuning, synchronous detection and white noise suppression arrangement in accordance with claim 10 wherein said phase-locked control loop further includes a limiter coupled between the selected intermediate frequency amplifier and said phase comparator means, and further wherein a phase shifter network is coupled between said reference oscillator and said synchronous detector.

12. Automatic fine tuning, synchronous detection and white noise suppression arrangement in accordance with claim 11 wherein said phase comparator means, limiter, reference oscillator, synchronous detector, phase shifter and noise clipper are designed in integrated circuit form for inclusion on a single, monolithic substrate chip.

13. Automatic fine tuning, synchronous detection and white noise suppression arrangement in accordance with claim 19 wherein said control means of said noise clipper is in the form of a zener diode means having a conduction level corresponding to maximum white level in the composite video signal as processed by said synchronous detector.

* * * * *